US008878981B2

(12) United States Patent  (10) Patent No.: US 8,878,981 B2
Lee  (45) Date of Patent: Nov. 4, 2014

(54) MEMS ACTUATOR MOUNTED CAMERA MODULE HAVING SAG COMPENSATION AND SAG COMPENSATION METHOD USING THE SAME

(75) Inventor: Junghyun Lee, Seoul (KR)

(73) Assignee: DigitalOptics Corporation, San Jose, CA (US)

(*) Notice: Subject to any disclaimer, the term of this patent is extended or adjusted under 35 U.S.C. 154(b) by 86 days.

(21) Appl. No.: 13/700,324

(22) PCT Filed: May 27, 2011

(86) PCT No.: PCT/KR2011/003894
§ 371 (c)(1),
(2), (4) Date: Nov. 27, 2012

(87) PCT Pub. No.: WO2011/149300
PCT Pub. Date: Dec. 1, 2011

(65) Prior Publication Data
US 2013/0070149 A1   Mar. 21, 2013

(30) Foreign Application Priority Data
May 28, 2010  (KR) .................. 10-2010-0050613

(51) Int. Cl.
*H04N 5/232* (2006.01)
*H04N 5/225* (2006.01)
*G03B 13/00* (2006.01)
*G02B 26/08* (2006.01)

(52) U.S. Cl.
CPC ............ *H04N 5/232* (2013.01); *G02B 26/0841* (2013.01); *H04N 5/2254* (2013.01); *G02B 26/0875* (2013.01)

USPC ............................ 348/357; 348/345; 348/374

(58) Field of Classification Search
USPC ................................. 348/345, 357, 373–376
See application file for complete search history.

(56) References Cited

U.S. PATENT DOCUMENTS 7,693,408 B1 * 4/2010 Tsai .............................. 396/79
7,817,883 B2 * 10/2010 Morris et al. .................. 385/24
(Continued)

FOREIGN PATENT DOCUMENTS

| JP | 2000-208826 A | 7/2000 |
| JP | 2004-88896 A | 3/2004 |
| JP | 2009-244315 A | 10/2009 |

*Primary Examiner* — Roberto Velez
*Assistant Examiner* — Tuan Le
(74) *Attorney, Agent, or Firm* — Haynes and Boone, LLP (57) ABSTRACT

The present invention relates to a micro-electromechanical (MEMS) actuator mounted camera module having sag compensation and a sag compensation method using the same, the camera module including a MEMS actuator mounted with a lens; a MEMS actuator moving unit outputting electrostatic capacity information corresponding to position of the lens changed by displacement move and outputting a displacement move signal to the MEMS actuator for controlling the displacement moving force; a memory unit stored with reference signal information corresponding to a maximum displacement move in the displacement move; and a signal compensation unit calculating a step range corresponding to the displacement move of the MEMS actuator based on the electrostatic capacity information outputted from the MEMS actuator moving unit and the reference signal information stored in the memory unit and compensating the displacement moving force of the MEMS actuator based on the calculated step range.

20 Claims, 4 Drawing Sheets

(56) References Cited

U.S. PATENT DOCUMENTS

| | | | |
|---|---|---|---|
| 2003/0147148 A1* | 8/2003 | Kubo | 359/719 |
| 2005/0249487 A1* | 11/2005 | Gutierrez | 396/85 |
| 2006/0076853 A1* | 4/2006 | Weaver et al. | 310/317 |
| 2006/0186758 A1* | 8/2006 | Yuasa et al. | 310/317 |
| 2006/0280493 A1* | 12/2006 | Kim | 396/133 |
| 2007/0071428 A1* | 3/2007 | Chen | 396/79 |
| 2007/0188631 A1* | 8/2007 | Yoshitsugu et al. | 348/240.3 |
| 2009/0185067 A1* | 7/2009 | Cho et al. | 348/345 |
| 2009/0245727 A1 | 10/2009 | Shimizu et al. | |
| 2010/0246030 A1* | 9/2010 | Chang et al. | 359/717 |

* cited by examiner

MEMS ACTUATOR MOUNTED CAMERA MODULE HAVING SAG COMPENSATION AND SAG COMPENSATION METHOD USING THE SAME

TECHNICAL FIELD

The teachings in accordance with the exemplary embodiments of this invention relate generally to a micro-electromechanical (MEMS) actuator mounted camera module having sag compensation, and more particularly to a method for compensating non-linear characteristic of a MEMS actuator having a relatively and mutually different displacement move (or step range) according to shooting direction, a sag compensation method using the same, and a MEMS actuator mounted camera module using the same.

BACKGROUND ART

Figure 1:
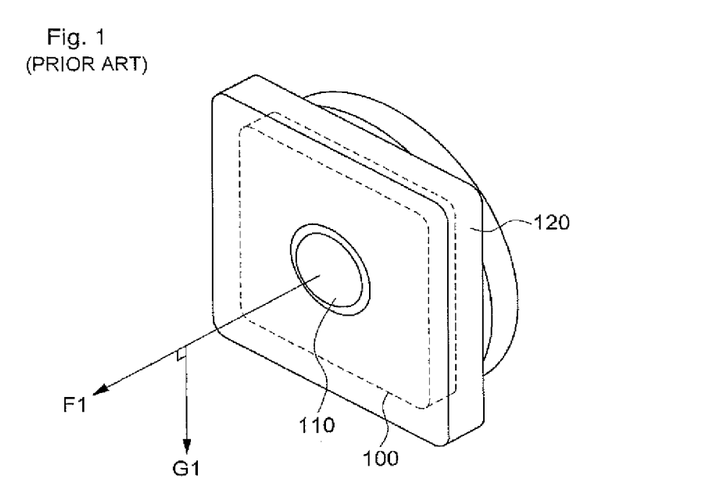
FIGS. 1, 2 and 3 are perspective views illustrating a sag phenomenon (a phenomenon in which a driving voltage is changed to a operational environment due to inconsistent operational scope) acting on a configuration of a micro-electromechanical (MEMS) actuator mounted camera module according to prior art.
Figure 2:
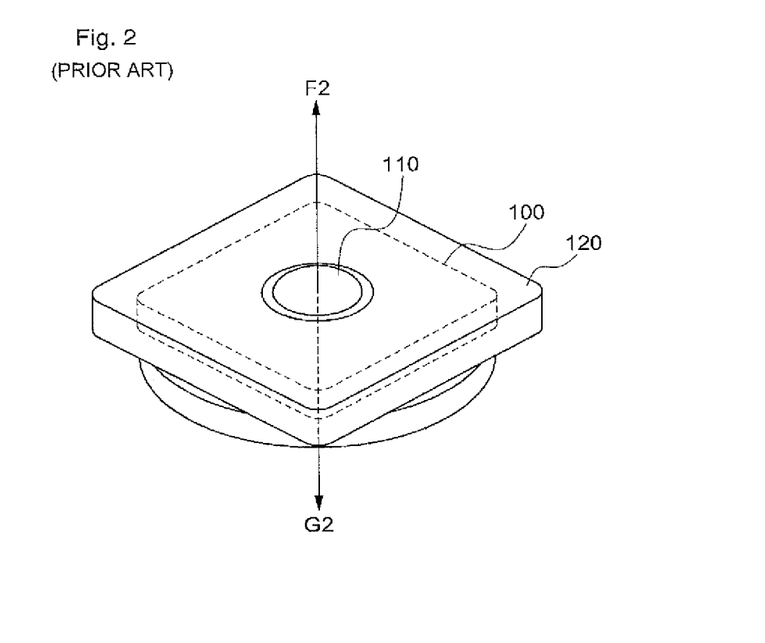
Figure 3:
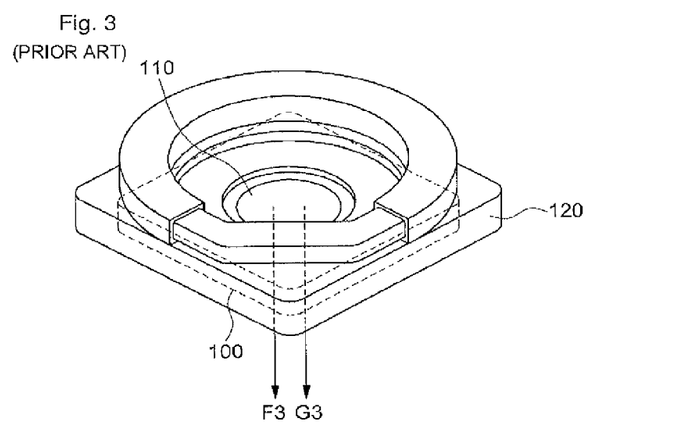

FIGS. 1, 2 and 3 are perspective views illustrating a sag phenomenon (a phenomenon in which a driving voltage is changed to an operational environment due to inconsistent operational scope) acting on a configuration of a micro-electromechanical (MEMS) actuator mounted camera module according to prior art.

As illustrated in FIG. 1, a shutter device (120), a micro-electromechanical (MEMS) actuator (100) mounted inside the shutter device (120) and a lens (110) respectively face a horizontal shooting (photographing) direction. Furthermore, a lens moving force (F1) that acts on the lens (110) faces the same horizontal shooting direction, which is perpendicular to gravity (G1), as shown in FIG. 1.

However, as depicted in FIGS. 2 and 3, in case a lens moving force (F2) is opposite to the gravity (G2) (FIG. 2, facing up) and a lens moving force (F3) is in the same direction with gravity (G3) (FIG. 3, facing down), it could be said that an operational scope of the MEMS actuator for realizing a same focal distance cannot be as shown in FIG. 1.

The sag phenomenon occurs due to influence by gravity caused by the shooting direction even in the unlikely event of extreme directions as shown in FIGS. 2 and 3, whereby an operational scope of the lens (110) positioned at an upper surface of the MEMS actuator (100) cannot be constantly guaranteed.

Despite the probability of accurate position adjustment of the MEMS actuator (100), there is a high chance of a large error in focal distance being developed if the sag phenomenon is generated, whereby reliability on auto-focusing (AF) algorithm of a camera module disadvantageously deteriorates.

Thus, there is a need of a new type of a camera module capable of constantly controlling a lens (110) displacement move (drive) by compensating the sag phenomenon even if the shooting directions of the camera module variably change.

DISCLOSURE OF INVENTION

Technical Problem

The present invention is directed to solve at least one or more of the aforementioned problems in whole or in part and to provide a micro-electromechanical (MEMS) actuator mounted camera module having sag compensation capable of constantly controlling a displacement move (drive) of a focus-adjustable actuator in any shooting directions of the camera module, and a sag compensation method using the same.

The present invention is also directed to provide a micro-electromechanical (MEMS) actuator mounted camera module having sag compensation capable of accurately controlling a displacement move (drive) of a focus-adjustable actuator to thereby enhance reliability in auto-focusing adjustment, and a sag compensation method using the same.

Technical problems to be solved by the present invention are not restricted to the above-mentioned, and any other technical problems not mentioned so far will be clearly appreciated from the following description by skilled in the art.

Solution to Problem

An object of the invention is to overcome at least one or more of the above problems and/or disadvantages in whole or in part, and/or provide at least the advantages described hereinafter, and/or make improvements in the prior art. In order to achieve at least the above objects, in whole or in part, and in accordance with the purposes of the invention, as embodied and broadly described, and in one general aspect of the present invention, there is provided a micro-electromechanical (MEMS) actuator mounted camera module having sag compensation, the camera module comprising: a MEMS actuator mounted with a lens to output a displacement moving force for displacement drive of the lens based on electrostatic force for adjustment of a focal distance between the lens and an image sensor; a MEMS actuator moving unit outputting electrostatic capacity information corresponding to position of the lens changed by displacement move and outputting a displacement move signal to the MEMS actuator for controlling the displacement moving force; a memory unit stored with reference signal information corresponding to a maximum displacement move in the displacement move; and a signal compensation unit calculating a step range corresponding to the displacement move of the MEMS actuator based on the electrostatic capacity information outputted from the MEMS actuator moving unit and the reference signal information stored in the memory unit and compensating the displacement moving force of the MEMS actuator based on the calculated step range, wherein the electrostatic capacity information outputted from the MEMS actuator moving unit includes minimum electrostatic capacity information and maximum electrostatic capacity information based on sag in a shooting direction of the image sensor.

Preferably, the calculated step range includes a start code in response to the minimum electrostatic capacity information, and a code step range in stop code corresponding to the maximum electrostatic capacity information.

Preferably, the reference signal information is maximum voltage information corresponding to the maximum displacement move.

Preferably, a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, start code is a code from which electrostatic capacity change starts.

Preferably, a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, stop code is a code from which electrostatic capacity change ends.

Preferably, an n step displacement move signal corresponding to n step in the compensated displacement move signal can be calculated by the following Equation:

$$V_{out} = \left(\frac{\text{number of } n \text{ step code}}{\text{number of entire step codes}} \times (\text{stop code} - \text{start code}) + \text{start code}\right) \times \frac{V_{ref}}{\text{number of entire step codes}}$$

where, Vout is n step displacement move signal, Vref is a reference signal having reference signal information, number of entire step codes is a number of entire codes in the code step range, start code is a code where electrostatic capacity change starts, and stop code is a code from which electrostatic capacity change ends.

Preferably, the sag is generated by gravity as a base, the gravity acting on the lens or the MEMS actuator in the shooting direction.

Preferably, the memory unit includes a non-volatile memory.

In another general aspect of the present invention, there is provided a sag compensation method using a MEMS actuator mounted camera module having sag compensation, the method comprising: outputting, by a MEMS actuator moving unit, a displacement moving signal for displacement move of a lens that faces a shooting direction (S110); receiving, by the MEMS actuator moving unit, the displacement moving signal to output a displacement moving force to the lens based on electrostatic force (S120); outputting, by the MEMS actuator moving unit, minimum electrostatic capacity information and maximum electrostatic capacity information caused by sag based on the displacement move (S130); calculating, by a signal compensation unit, a step range for adjustment of focal distance, based on reference signal information corresponding to maximum displacement move in the displacement move, the minimum electrostatic capacity information and maximum electrostatic capacity information (S140); and compensating, by the signal compensation unit, the displacement move signal based on the step range (S150).

Preferably, the method is further comprising receiving, by the MEMS actuator moving unit, an initialization signal which is a moving signal, from a pre-set entire step range from a user (S105), prior to the displacement moving signal outputting step by the MEMS actuator moving unit (S110).

Preferably, the method is further comprising displacement-moving, by the lens, from a minimum focal distance position to a maximum focal distance position in relation to an image sensor, or from the maximum focal distance position to the minimum focal distance position in relation to an image sensor (S125), between the displacement moving force outputting step by the MEMS actuator (S120) and the electrostatic capacity information outputting step by the MEMS actuator moving unit (S130).

Preferably, the step range calculating step by the signal compensation unit (S140) includes calculating, by the signal compensation unit, a start code corresponding to the minimum electrostatic capacity information, and a code step range based on a stop code corresponding to the maximum electrostatic capacity information.

Preferably, a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, start code is a code from which electrostatic capacity change starts.

Preferably, a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, stop code is a code from which electrostatic capacity change ends.

Preferably, an n step displacement move signal corresponding to n step in the compensated displacement move signal can be calculated by the following Equation:

$$V_{out} = \left(\frac{\text{number of } n \text{ step code}}{\text{number of entire step codes}} \times (\text{stop code} - \text{start code}) + \text{start code}\right) \times \frac{V_{ref}}{\text{number of entire step codes}}$$

where, Vout is n step displacement move signal, Vref is a reference signal having reference signal information, number of entire step codes is a number of entire codes in the code step range, start code is a code where electrostatic capacity change starts, and stop code is a code from which electrostatic capacity change ends.

In still another general aspect of the present invention, there is provided a micro-electromechanical (MEMS) actuator mounted camera module having sag compensation, the camera module comprising: a MEMS actuator mounted with a lens to adjust a focal distance between the lens and an image sensor through displacement move; a MEMS actuator moving unit outputting minimum and maximum electrostatic capacity information caused by sag that is generated by gravity as a base, the gravity acting on any one of the lens and the MEMS actuator corresponding to position of the lens from a shooting direction of the image sensor, and controlling the displacement move; a memory unit stored with reference signal information provided as maximum voltage information corresponding to maximum displacement move in the displacement moves; and a signal compensation unit outputting a displacement move compensation signal to the MEMS actuator moving unit based on a step range by calculating the step range corresponding to the displacement move of the MEMS actuator based on the electrostatic capacity information outputted from the MEMS actuator moving unit and the reference signal information stored in the memory unit.

Preferably, the calculated step range includes a start code in response to the minimum electrostatic capacity information, and a code step range in stop code corresponding to the maximum electrostatic capacity information.

Preferably, a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, start code is a code from which electrostatic capacity change starts.

Preferably, a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, stop code is a code from which electrostatic capacity change ends.

Preferably, an n step displacement move signal corresponding to n step in the compensated displacement move signal can be calculated by the following Equation:

$$V_{out} = \left( \frac{\text{number of } n \text{ step code}}{\text{number of entire step codes}} \times (\text{stop code} - \text{start code}) + \text{start code} \right) \times \frac{V_{ref}}{\text{number of entire step codes}}$$

where, Vout is n step displacement move signal, Vref is a reference signal having reference signal information, number of entire step codes is a number of entire codes in the code step range, start code is a code where electrostatic capacity change starts, and stop code is a code from which electrostatic capacity change ends.

Advantageous Effects of Invention

The exemplary embodiments of the present invention have advantageous effect in that sag generated by gravity acting on a camera module can be compensated to constantly control a displacement move of a focus adjusting actuator in any shooting directions.

The exemplary embodiments of the present invention have another advantageous effect in that reliability can be provided to an automatic focus adjustment by constantly controlling the displacement move of the focus adjusting actuator.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description.

It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof may be used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientation relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

As used in the specification and in the claims, the singular form of "a", "an", and "the" include plural referents unless the context clearly dictates otherwise.

Figure 4:
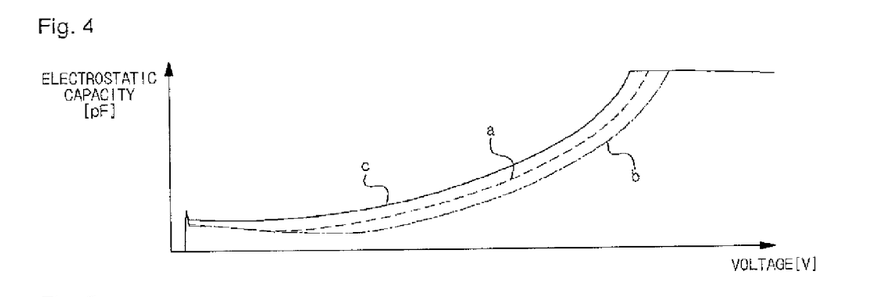
FIG. 4 is a graph illustrating an electrostatic capacity change of MEMS actuator in response to change in displacement move signal in each shooting (photographing) direction (facing horizontal, facing up, facing down) in FIGS. 1, 2 and 3.

FIG. 4 is a graph illustrating an electrostatic capacity change of MEMS actuator in response to change in displacement move signal in each shooting (photographing) direction (facing horizontal, facing up, facing down) in FIGS. 1, 2 and 3, where horizontal axis represents a size of a driving voltage, and a vertical axis represents an electrostatic capacity of a MEMS actuator (100).

As illustrated in FIG. 4, in case of shooting direction (facing horizontal direction) of FIG. 1, an electrostatic capacity change is shown as in 'a', while in case of a shooting direction (facing up direction) of FIG. 2, the electrostatic capacity change is illustrated as in 'b', such that it can be noted that the electrostatic capacity is greater in the same driving voltage as in FIG. 1. Alternatively, in case of shooting direction (facing down direction) of FIG. 3, the electrostatic capacity change is illustrated as in 'c', such that the electrostatic capacity is smaller in the same driving voltage as in FIG. 1.

A driving distance error of a lens that is generated by difference in electrostatic capacity in response to the shooting directions (facing horizontal direction, facing up direction and facing down direction) is approximately 10% or more of a total driving distance. The error is an error greater enough to create inaccuracy in an automatic focusing algorithm due to inconsistent lens movement according to a step section applied with the automatic focusing algorithm.

The result shown in FIG. 4 is one generated by sag caused by gravity, and in order to compensate the result, an exemplary embodiment for accurately controlling a lens (110) displacement move will be explained in the following manner.

Figure 5:
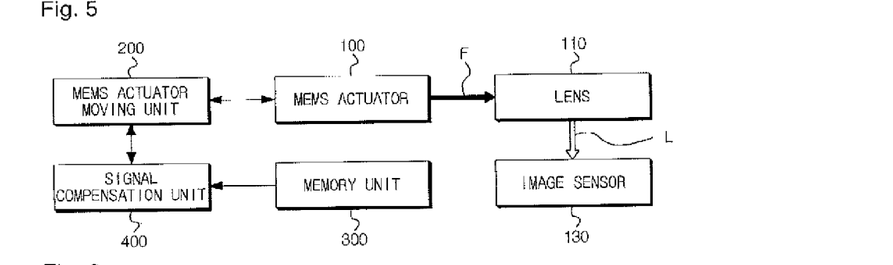
FIG. 5 is a constitutional diagram illustrating a micro-electromechanical (MEMS) actuator mounted camera module according to an exemplary embodiment of the present invention.

FIG. 5 is a constitutional diagram illustrating a microelectromechanical (MEMS) actuator mounted camera module according to an exemplary embodiment of the present invention.

Referring to FIG. 5, the camera module according to an exemplary embodiment of the present invention includes a lens (110), a MEMS actuator (100), a MEMS actuator moving unit (200), a memory unit (300) and a signal compensation unit (400). Of course, an image sensor (130) is included for shooting an image.

Now, operation of the camera module according to the exemplary embodiment of the present invention will be briefly explained.

In a case the MEMS actuator moving unit (200) outputs a displacement move signal to the MEMS actuator (100), the MEMS actuator (100) displacement-moves the lens (110), and as a result, the signal compensation unit (400) calculates a step range based on electrostatic capacity information of the MEMS actuator (100) to thereby compensate the displacement move signal. In short, the compensated displacement move signal can guarantee a constant displacement move of the lens (110).

Now, constitution of the camera module according to the exemplary embodiment of the present invention will be illustrated with reference to FIG. 5.

The lens (110) functions to refract light (L) outputted from an object to condense the refracted light to the image sensor (130). The lens (110) mounted on the MEMS actuator (100) also vertically moves toward the image sensor (130) in which an image of a predetermined object is photographed to adjust a focal distance from the image sensor (130).

The image sensor (130) is an element for shooting an image of a predetermined object, may be a CCD (Charged Coupled Device) image sensor, or a CMOS (Complementary Metal-Oxide Semiconductor) image sensor.

The MEMS actuator moving unit (200) functions to output the electrostatic capacity information inputted from the MEMS actuator (100) to the signal compensation unit (400) in response to a position of the lens (110) changed by displacement move of the lens (110), and output the displacement move signal to the MEMS actuator (100) in order to control the displacement moving force of the lens (110).

The MEMS actuator moving unit (200) basically functions to receive lens displacement information from an automatic focus adjustment unit (not shown) that is applied with a predetermined automatic focus algorithm, and output a displacement move signal corresponding to the lens displacement information to the MEMS actuator (100).

The MEMS actuator (100) is mounted with the lens (110) and functions to receive the displacement move signal from the MEMS actuator moving unit (200) to output a displacement move force of the lens (110) based on electrostatic force.

The MEMS actuator (100) according to the present invention is a comb-driver actuator using the electrostatic force as the displacement move force, and provides a displacement move force based on the electrostatic force directly to the lens (110) to vertically move the lens (110).

The MEMS actuator (100) includes micro-unit elements for adjusting the position of the lens (110) on silicon chips using a semiconductor manufacturing process, and a micro circuit connecting the micro-unit elements.

The memory unit (300) stores reference signal information corresponding to a maximum displacement move among the displacement moves, and provides the reference signal information to the signal compensation unit (400). The memory unit (300) includes a non-volatile memory.

At this time, the reference signal information is maximum voltage information corresponding to maximum displacement move of the lens (110), and a displacement move signal allowing the lens (110) to maximally displacement-move when there is no sag by gravity.

The signal compensation unit functions to calculate a step range corresponding to the displacement move of the MEMS actuator based on the electrostatic capacity information outputted from the MEMS actuator moving unit and the reference signal information stored in the memory unit and to compensate the displacement moving force of the MEMS actuator based on the calculated step range.

Figure 7:
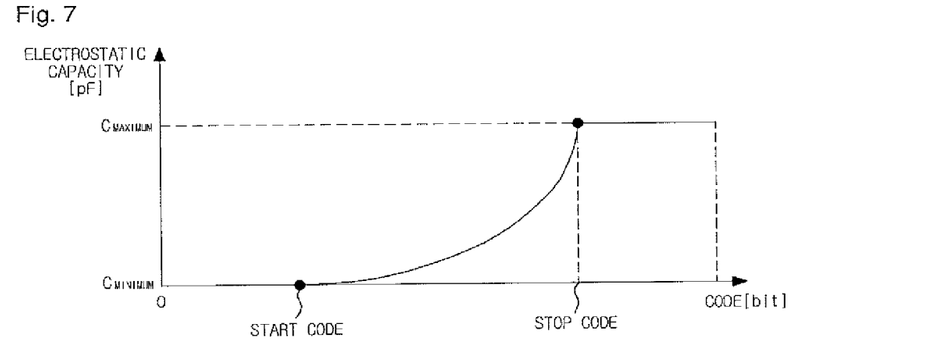
FIG. 7 is a graph illustrating a start code and a stop code in a configuration of a micro-electromechanical (MEMS) actuator mounted camera module having sag compensation according to an exemplary embodiment of the present invention.
Figure 8:
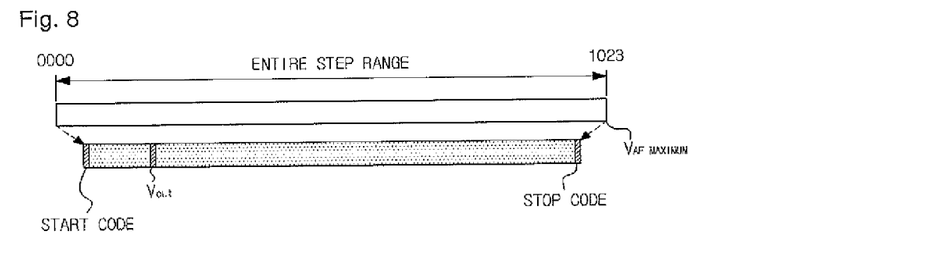
FIG. 8 is a schematic view illustrating a step range calculation and compensation of displacement move signal in a configuration of a micro-electromechanical (MEMS) actuator mounted camera module having sag compensation according to an exemplary embodiment of the present invention.

At this time, the step range defines a code step range based on a pre-set bit resolution, a detailed explanation of which will be provided with reference to FIGS. 7 and 8. The compensated displacement move signal may be expressed by a bit code calculated by reflecting sag influence. The signal compensation unit (400) may be configured on a DSP (Digital Signal Processor). However, the configuration is not particularly restricted and may be configured as a separate processor capable of functioning as the signal compensation unit (400).

Furthermore, I2C Bus may be linked between the signal compensation unit (400) and the MEMS actuator moving unit (200) to smoothly make progress of shooting through fast transmission/receipt of electrostatic capacity information and compensated displacement move signal.

FIG. 6 is a graph illustrating a relationship between an electrostatic capacity of MEMS actuator and a lens move displacement in a configuration of a micro-electromechanical (MEMS) actuator mounted camera module having sag compensation according to an exemplary embodiment of the present invention.

Figure 6A:
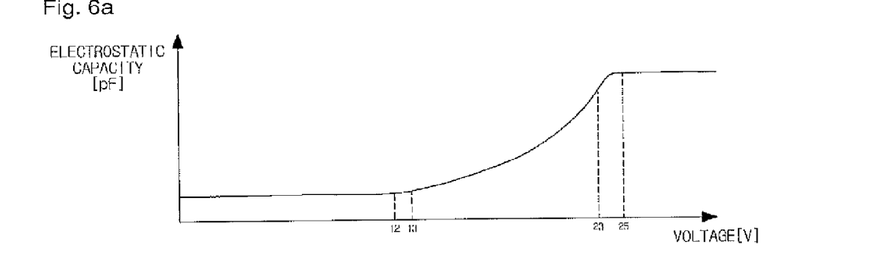
FIG. 6 is a graph illustrating a relationship between an electrostatic capacity of MEMS actuator and a lens move displacement in a configuration of a micro-electromechanical (MEMS) actuator mounted camera module having sag compensation according to an exemplary embodiment of the present invention.
Figure 6B:
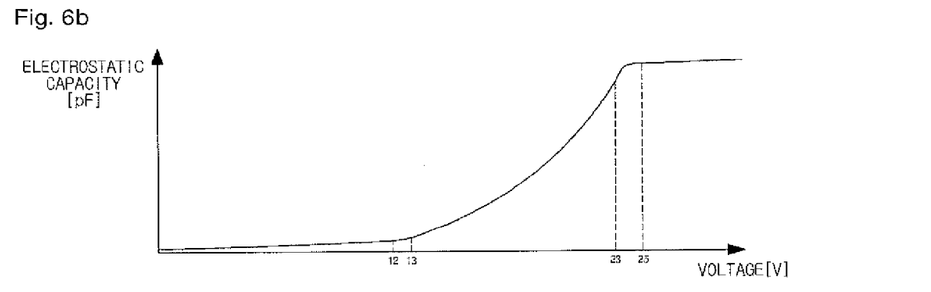

Referring to FIGS. 6a and 6b, it could be noted that shapes of two graphs are changed in the same pattern to voltage change. That is, the electrostatic capacity change of the MEMS actuator (100) based on voltage change and move (drive) change {or move displacement of the lens (110)} of the MEMS actuator (100) are equal or homogeneous. Therefore, the electrostatic capacity change defines generation of move displacement.

FIG. 7 is a graph illustrating a start code and a stop code in a configuration of a micro-electromechanical (MEMS) actuator mounted camera module having sag compensation according to an exemplary embodiment of the present invention.

Referring to FIG. 7, the start code defines a code where the electrostatic capacity change starts among step codes for automatic focus adjustment (or a code at a point where move displacement of the MEMS actuator (100) is generated), and the stop code is a code the electrostatic capacity change ends among step codes for automatic focus adjustment (or a code at a point where move displacement of the MEMS actuator (100) is finished).

FIG. 8 is a schematic view illustrating a step range calculation and compensation of displacement move signal in a configuration of a micro-electromechanical (MEMS) actuator mounted camera module having sag compensation according to an exemplary embodiment of the present invention.

A code step range having a 10-bit resolution may have 2¹⁰=1,024 code steps, where assuming that the 1,023rd code is a step code necessary for maximum displacement move, and alternatively 0000 is a step code necessary for minimum displacement move, Vmax and Vref are same, and Vmin outputs zero voltage. In this case, a step range section is selected from between O volt and Vref, and a lens displacement move may have a considerable error during sag generation based on measurement direction.

It is therefore preferable that the MEMS actuator (100) be moved (driven) by Vout (Equation 3) corrected within a Vmin (Equation 1) section corresponding to an actual start code and a Vmax (Equation 2) section corresponding to actual stop code for lens displacement move for an accurate automatic focus algorithm.

Referring to FIG. 8, a minimum displacement move signal of the MEMS actuator (100) corresponding to the start code may be calculated by the following Equation:

$$V_{min} = \frac{\text{start code}}{\text{number of entire step codes}} \times V_{ref} \quad \langle \text{Equation 1} \rangle$$

where, Vmin is an actual minimum displacement move signal, Vref is a reference signal having maximum voltage information, number of entire step codes is a number of entire codes in the code step range, start code is a code from which electrostatic capacity change starts.

Likewise, a maximum displacement move signal corresponding to the stop code may be calculated by the following Equation:

$$V_{max} = \frac{\text{stop code}}{\text{number of entire step codes}} \times V_{ref} \quad \langle \text{Equation 2} \rangle$$

where, Vmax is a maximum displacement move signal, Vref is a reference signal having maximum voltage information, number of entire step codes is a number of entire codes in the code step range, stop code is a code from which electrostatic capacity change ends.

Furthermore, an n step displacement move signal corresponding to n step in the compensated displacement move signal can be calculated by the following Equation:

$$V_{out} = \left( \frac{\text{number of } n \text{ step code}}{\text{number of entire step codes}} \times (\text{stop code} - \text{start code}) + \text{start code} \right) \times \frac{V_{ref}}{\text{number of entire step codes}} \quad \langle \text{Equation 3} \rangle$$

where, Vout is n step displacement move signal, Vref is a reference signal having reference signal information, number of entire step codes is a number of entire codes in the code step range, start code is a code where electrostatic capacity change starts, and stop code is a code from which electrostatic capacity change ends.

At this time, the Equation 3 may be changed based on the number of steps, and in case of assuming an entire step code (DAC, Digital AF Code) as 1,023 codes and an nth step among m number of steps, the n step code may be calculated in the form of the number of entire step codes x (n/m).

Now, the sag compensation of the displacement move signal will be explained with reference to FIG. 8.

First of all, if sag generation is not considered, and in case of assuming 20 steps among the entire step range (0000~1,023), displacement move signal of 1 step is calculated. For example, the number of 1 step code may be calculated by 1,023/20=approximately 51 codes, and in case of assuming a start code as zero, a stop code as 1,023, reference signal information as 30 volts, a result to 1 step by the Equation 3 is Vout=51÷1023×30=approximately 1,495 volts. Furthermore, for displacement up to 20 steps, a result of Vout=20×1.495 or (51×20÷1023)×30=29.912 can be derived.

However, the lens move position under all measurement environments is influenced by gravity, and in this case, the step range may be differently calculated, whereby the displacement move signal can be compensated. For example, assuming that a start code of 103, and a stop code of 1,006 are obtained based on the electrostatic capacity information, the number of 1 step code is 51 codes, and reference signal information is 30 volts, a result of Vout=((51÷1023)×(1006−103)+103)×(30÷1023)=approximately 4.34 volts can be obtained based on the Equation 3.

In case of step range compensation, the displacement move signal at 20 step cannot be applied with calculation manner of 4.39×20, such that a result of 29.423 can be obtained by Vout=((51×20÷1023)×(1006−103)+103)×(30÷1023).

That is, the above result means that in case of there being sag, a displacement move signal of 4.34 volts instead of 1.495 volts in step 1 section must be applied to obtain a move displacement of the MEMS actuator that is same as a case of there being no sag, and 29.423 volts instead of 29.912 volts must be applied n step 20 section.

COMPENSATION METHOD

Mode for the Invention

Figure 9:
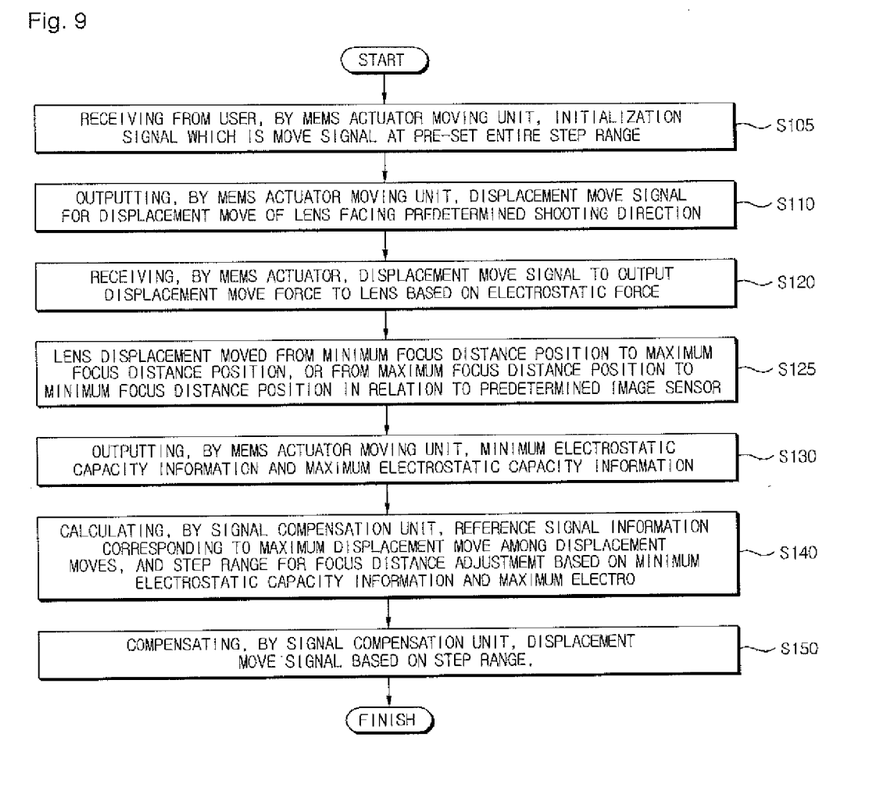
FIG. 9 is a flowchart sequentially illustrating a sag compensation method using a micro-electromechanical (MEMS) actuator mounted camera module having sag compensation according to an exemplary embodiment of the present invention.

FIG. 9 is a flowchart sequentially illustrating a sag compensation method using a micro-electromechanical (MEMS) actuator mounted camera module having sag compensation according to an exemplary embodiment of the present invention.

Referring to FIG. 9, first of all, the MEMS actuator moving unit (200) receives an initialization signal which is move signal at a pre-set entire step range, from a user (S105), which is to obtain electrostatic capacity information corresponding to the entire step range.

Next, the MEMS actuator moving unit (200) outputs a displacement move signal for displacement move of the lens (110) facing a predetermined shooting (photographing) direction (S110), from where (S110), a displacement move signal is outputted from an initial step of the entire step range to a last step for obtaining a start code corresponding to the minimum electrostatic capacity information and a stop code corresponding to the maximum electrostatic capacity information.

Successively, the MEMS actuator (100) receives the displacement move signal to output a displacement move force to the lens (110) based on electrostatic force (S120). Then, the lens (110) may be displacement-moved from a minimum focal distance position to a maximum focal distance position in relation to a predetermined image sensor (130), or may be displacement-moved from the maximum focal distance position to the minimum focal distance position.

Thereafter, the MEMS actuator moving unit (200) outputs minimum electrostatic capacity information and maximum electrostatic capacity information caused by sag and based on displacement move (S130).

Successively, the signal compensation unit (400) calculates a step range for focus distance adjustment based on the reference signal information corresponding to the maximum displacement move during the displacement move, the minimum electrostatic capacity information and maximum electrostatic capacity information (S140). The step (S140) may be calculated by obtainment of start code and stop code.

Lastly, the signal compensation unit (400) compensates the displacement move signal based on the step range (S150) to perform the sag compensation method using a micro-electromechanical (MEMS) actuator mounted camera module having sag compensation. Of course, it should be apparent that the step of the MEMS actuator (100) being displacement-moved by the MEMS actuator moving unit (200) that has received the compensated displacement move signal.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has industrial applicability in that sag generated by gravity acting on a camera module can be compensated to constantly control a displacement move of a focus adjusting actuator in any shooting directions, and therefore reliability can be provided to an automatic focus adjustment by constantly controlling the displacement move of the focus adjusting actuator.

The invention claimed is:

1. A micro-electromechanical (MEMS) actuator mounted camera module having sag compensation, the camera module comprising:
    a MEMS actuator mounted with a lens and configured to output a displacement moving force for a displacement drive of the lens based on an electrostatic force for adjustment of a focal distance between the lens and an image sensor;
    a MEMS actuator moving unit configured to output electrostatic capacity information corresponding to a position of the lens changed by a displacement move and configured to output a displacement move signal to the MEMS actuator to control the displacement moving force;
    a memory unit that stores reference signal information corresponding to a maximum displacement move in the displacement move; and
    a signal compensation unit configured to calculate a step range corresponding to the displacement move of the MEMS actuator based on the electrostatic capacity information outputted from the MEMS actuator moving unit and the reference signal information stored in the memory unit and configured to compensate the displacement moving force of the MEMS actuator based on the calculated step range,
    wherein the electrostatic capacity information outputted from the MEMS actuator moving unit includes minimum electrostatic capacity information and maximum electrostatic capacity information based on a sag in a shooting direction of the image sensor.

2. The camera module of claim 1, wherein the calculated step range includes a start code in response to the minimum electrostatic capacity information, and a code step range in a stop code corresponding to the maximum electrostatic capacity information.

3. The camera module of claim 2, wherein the reference signal information is maximum voltage information corresponding to the maximum displacement move.

4. The camera module of claim 2, wherein a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, and the start code is a code from which an electrostatic capacity change starts.

5. The camera module of claim 2, wherein a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, and the stop code is a code from which an electrostatic capacity change ends.

6. The camera module of claim 2, wherein an n step displacement move signal corresponding to n steps in the compensated displacement move signal can be calculated by the following Equation:

$$V_{out} = \left( \frac{\text{number of } n \text{ step code}}{\text{number of entire step codes}} \times (\text{stop code} - \text{start code}) + \text{start code} \right) \times \frac{V_{ref}}{\text{number of entire step codes}}$$

where, Vout is the n step displacement move signal, Vref is a reference signal having reference signal information, number of entire step codes is a number of entire codes in the code step range, the start code is a code where an electrostatic capacity change starts, and the stop code is a code from which the electrostatic capacity change ends.

7. The camera module of claim 1, wherein the sag is generated by gravity as a base, the gravity acting on the lens or the MEMS actuator in the shooting direction.

8. The camera module of claim 1, wherein the memory unit includes a non-volatile memory.

9. A sag compensation method using a MEMS actuator mounted camera module having sag compensation, the method comprising:

outputting, by a MEMS actuator moving unit, a displacement moving signal for a displacement move of a lens that faces a shooting direction;

receiving, by the MEMS actuator moving unit, the displacement moving signal to output a displacement moving force to the lens based on an electrostatic force;

outputting, by the MEMS actuator moving unit, minimum electrostatic capacity information and maximum electrostatic capacity information caused by a sag based on the displacement move;

calculating, by a signal compensation unit, a step range for adjustment of a focal distance, based on reference signal information corresponding to a maximum displacement move in the displacement move, the minimum electrostatic capacity information and the maximum electrostatic capacity information; and compensating, by the signal compensation unit, the displacement moving signal based on the step range.

10. The sag compensation method of claim 9, further comprising receiving, by the MEMS actuator moving unit, an initialization signal which is a moving signal, from a pre-set entire step range from a user, prior to the outputting of the displacement moving signal by the MEMS actuator moving unit.

11. The sag compensation method of claim 9, further comprising displacement-moving, by the lens, from a minimum focal distance position to a maximum focal distance position in relation to an image sensor, or from the maximum focal distance position to the minimum focal distance position in relation to the image sensor, between the outputting of the displacement moving force by the MEMS actuator moving unit and the outputting of the electrostatic capacity information by the MEMS actuator moving unit.

12. The sag compensation method of claim 9, wherein the calculating of the step range by the signal compensation unit includes calculating, by the signal compensation unit, a start code corresponding to the minimum electrostatic capacity information, and a code step range based on a stop code corresponding to the maximum electrostatic capacity information.

13. The sag compensation method of claim 12, wherein a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, and the start code is a code from which an electrostatic capacity change starts.

14. The sag compensation method of claim 12, wherein a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, and the stop code is a code from which an electrostatic capacity change ends.

15. The sag compensation method of claim 12, wherein an n step displacement move signal corresponding to n steps in the compensated displacement move signal can be calculated by the following Equation:

$$V_{out} = \left( \frac{\text{number of } n \text{ step code}}{\text{number of entire step codes}} \times (\text{stop code} - \text{start code}) + \text{start code} \right) \times \frac{V_{ref}}{\text{number of entire step codes}}$$

where, Vout is the n step displacement move signal, Vref is a reference signal having reference signal information, number of entire step codes is a number of entire codes in the code step range, the start code is a code where electrostatic capacity change starts, and the stop code is a code from which electrostatic capacity change ends.

16. A micro-electromechanical (MEMS) actuator mounted camera module having sag compensation, the camera module comprising:
 a MEMS actuator mounted with a lens and configured to adjust a focal distance between the lens and an image sensor through a displacement move;
 a MEMS actuator moving unit configured to output minimum and maximum electrostatic capacity information caused by a sag that is generated by gravity as a base, the gravity acting on any one of the lens and the MEMS actuator corresponding to a position of the lens from a shooting direction of the image sensor, and configured to control the displacement move;
 a memory unit that stores reference signal information provided as maximum voltage information corresponding to a maximum displacement move in the displacement move; and
 a signal compensation unit configured to output a displacement move compensation signal to the MEMS actuator moving unit based on a step range by calculating the step range corresponding to the displacement move of the MEMS actuator based on the electrostatic capacity information outputted from the MEMS actuator moving unit and the reference signal information stored in the memory unit.

17. The camera module of claim 16, wherein the calculated step range includes a start code in response to the minimum electrostatic capacity information, and a code step range in a stop code corresponding to the maximum electrostatic capacity information.

18. The camera module of claim 17, wherein a minimum displacement move signal corresponding to the start code is calculated by the following Equation:

$$V_{min} = \frac{\text{start code}}{\text{number of entire step codes}} \times V_{ref}$$

where, Vmin is an actual minimum displacement move signal, Vref is a reference signal having maximum voltage information, number of entire step codes is a number of entire codes in the code step range, and the start code is a code from which an electrostatic capacity change starts.

19. The camera module of claim 17, wherein a maximum displacement move signal corresponding to the stop code is calculated by the following Equation:

$$V_{max} = \frac{\text{stop code}}{\text{number of entire step codes}} \times V_{ref}$$

where, Vmax is a maximum displacement move signal, Vref is a reference signal having maximum voltage information, number of entire step codes is a number of entire codes in the code step range, and the stop code is a code from which an electrostatic capacity change ends.

20. The camera module of claim 17, wherein an n step displacement move signal corresponding to n steps in the compensated displacement move signal can be calculated by the following Equation:

$$V_{out} = \left( \frac{\text{number of } n \text{ step code}}{\text{number of entire step codes}} \times (\text{stop code} - \text{start code}) + \text{start code} \right) \times \frac{V_{ref}}{\text{number of entire step codes}}$$

where, Vout is an n step displacement move signal, Vref is a reference signal having reference signal information, number of entire step codes is a number of entire codes in the code step range, the start code is a code where an electrostatic capacity change starts, and the stop code is a code from which the electrostatic capacity change ends.

* * * * *